United States Patent [19]

Wu

[11] Patent Number: 5,722,676
[45] Date of Patent: *Mar. 3, 1998

[54] WHEELCHAIR FRAME ASSEMBLY

[76] Inventor: Johnson Wu, No. 52. Ching-Chien 3rd. Rd., Kuan-Yin Hsiang, Tao-Yuan Hsien, Taiwan

[*] Notice: The term of this patent shall not extend beyond the expiration date of Pat. No. 5,516,226.

[21] Appl. No.: 541,153

[22] Filed: Oct. 11, 1995

Related U.S. Application Data

[63] Continuation-in-part of Ser. No. 297,828, Aug. 30, 1994, Pat. No. 9,516,226.
[51] Int. Cl.⁶ .................................................. B62M 1/14
[52] U.S. Cl. ........................ 280/250.1; 403/403; 403/205
[58] Field of Search .......................... 280/250.1, 281.1; 403/205, 382, 403, 385; 264/328.1

[56] References Cited

U.S. PATENT DOCUMENTS

| | | | |
|---|---|---|---|
| 1,774,548 | 9/1930 | Feeny | 403/403 |
| 4,484,832 | 11/1984 | Weissenberger | 403/403 |
| 4,840,390 | 6/1989 | Lockard et al. | 280/250.1 |
| 4,902,160 | 2/1990 | Jeng | 403/205 |
| 5,253,888 | 10/1993 | Friedrich | 280/250.1 |
| 5,267,745 | 12/1993 | Robertson et al. | 280/250.1 |
| 5,284,350 | 2/1994 | Geiger et al. | 390/250.1 |
| 5,516,226 | 5/1996 | Wu | 280/250.1 |

*Primary Examiner*—Brian L. Johnson
*Assistant Examiner*—Gary Savitt
*Attorney, Agent, or Firm*—Bacon & Thomas

[57] ABSTRACT

A wheelchair frame assembly made by connecting a plurality of unit frames together, each unit frame including a plurality of metal frame tubes, and a plastic cover shell directly molded on the metal frame tubes, each metal frame tube having one end embedded in the plastic cover shell and an opposite end exposed to the exterior for mounting another element, the cover shell having a plurality of integral arm sections respectively connected between each two adjacent metal frame tubes, a plurality of integral rod sections respectively fitted into the embedded end of each metal frame tube, and at least one coupling portion for connection of a respective coupling portion of another unit frame.

8 Claims, 6 Drawing Sheets

WHEELCHAIR FRAME ASSEMBLY

CROSS-REFERENCE TO RELATED APPLICATION

The present invention is a continuation-in-part of application Ser. No. 8/297,828, filed on Aug. 30, 1994, and now U.S. Pat. No. 5,516,226.

BACKGROUND OF THE INVENTION

The present invention relates to a wheelchair frame assembly which is comprised of a plurality of unit frames detachably connected to one another, each frame unit comprising a plurality of metal frame tubes and a plastic cover shell directly molded on the metal frame tubes.

The frame of a regular wheelchair is made by welding a plurality of metal frame tubes into shape. This wheelchair frame structure has drawbacks. Because the metal frame tubes are connected together by welding, it is difficult to accurately fix the positions of the metal frame tubes relative to one another. Besides, the welding process adversely affects the structural strength of the metal frame tubes, and causes the welded area to gather rust easily. Therefore, the frame must be electroplated after the process of welding. However, electroplating the frame greatly increases the manufacturing cost of the frame, and will cause environmental pollutions. Furthermore, the shapes and positions of the parts of the frame cannot be adjusted or changed after the process of welding.

SUMMARY OF THE INVENTION

The present invention provides a wheelchair frame assembly which eliminates the aforesaid drawbacks. According to the present invention, the wheelchair frame assembly is formed by detachably connecting a plurality of unit frames together without the application of welding. Each of the unit frames is comprised of three metal frame tubes arranged in a substantially U-shaped configuration, and a plastic cover shell is directly molded on the metal frame tubes to hold them together. The plastic cover shell eliminates the process of electroplating, and can be made in the desired colors to decorate the wheelchair frame assembly. The plastic cover shell comprises integral arm sections respectively connected between each two adjacent metal frame tubes, and integral rod sections are respectively fitted into one end of each metal frame tube to support the metal frame tubes against compressive force.

DETAILED DESCRIPTION OF THE PREFERRED EMBODIMENT

Figure 5:
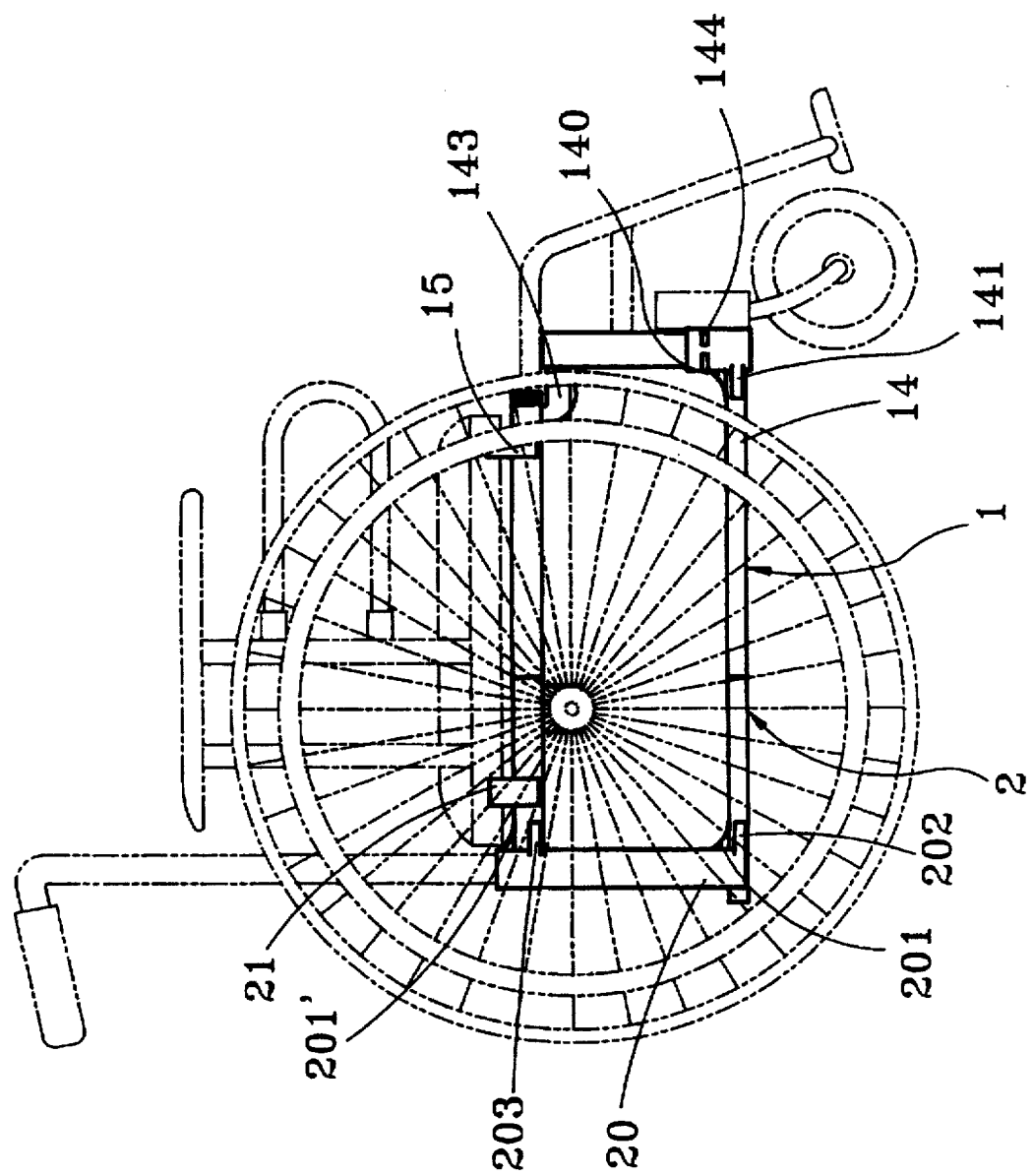
FIG. 5 is a side view of a wheelchair constructed according to the present invention.

Referring to FIG. 5, the frame assembly of a wheelchair according to the present invention is made by connecting a plurality of unit frames 1 and 2 together. The unit frames 1 and 2 are made in the same way.

Figure 1:
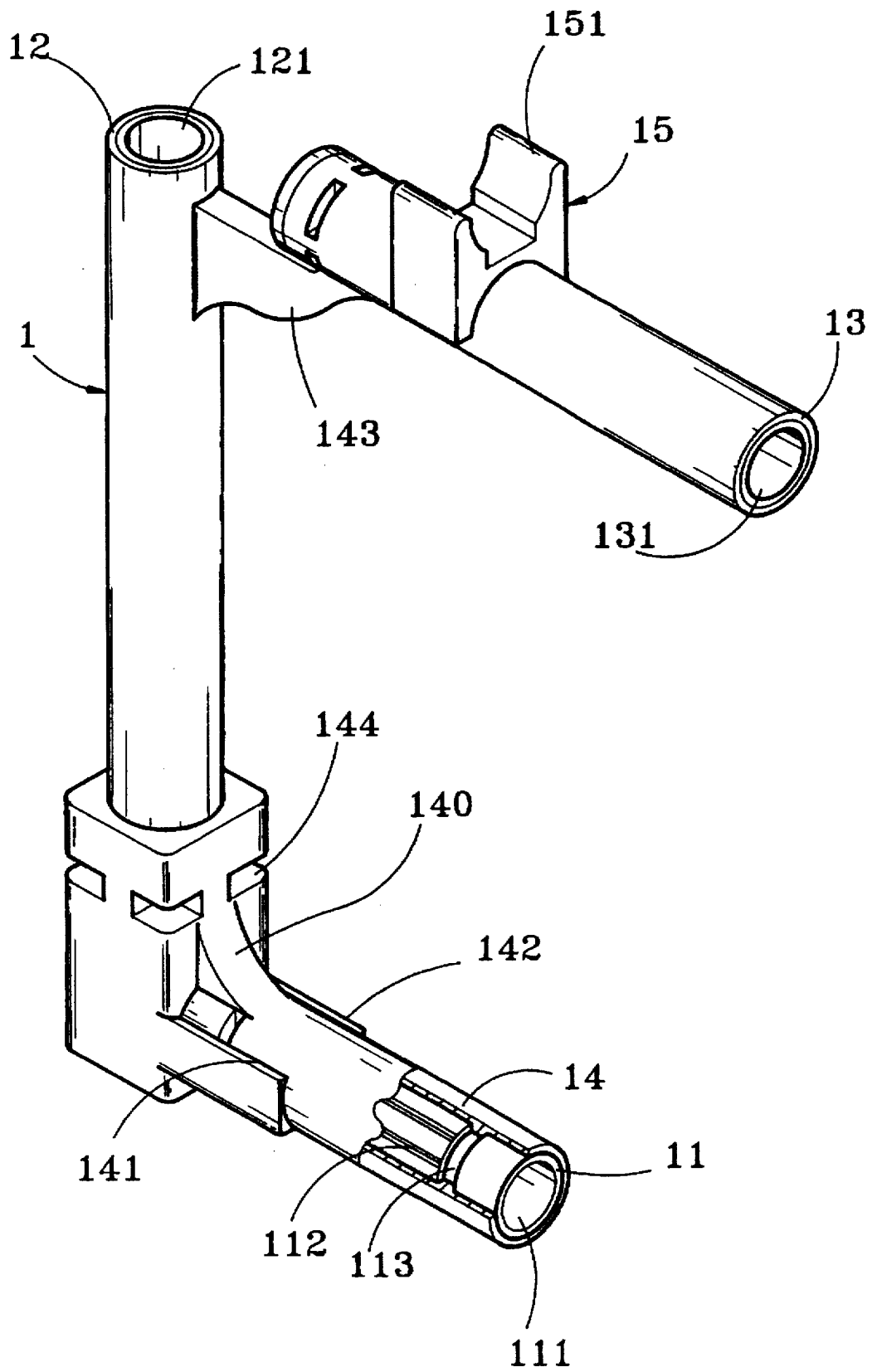
FIG. 1 shows a unit frame according to the present invention.
Figure 3:
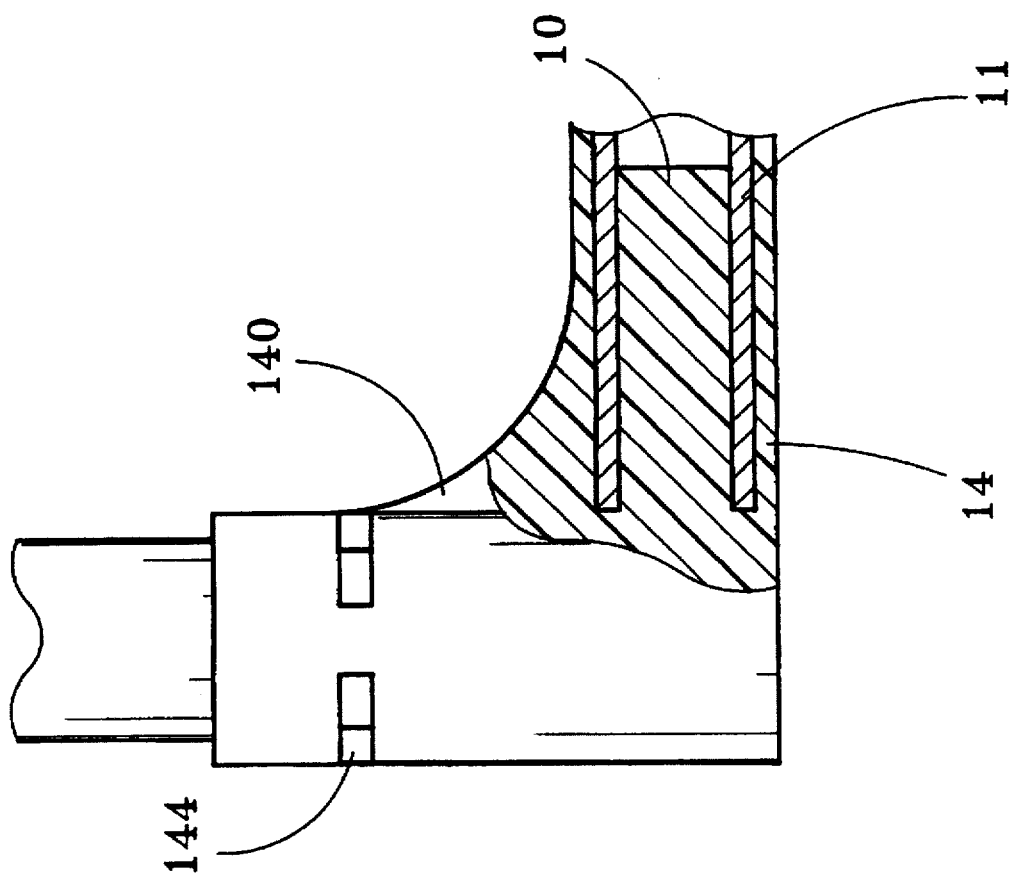
FIG. 3 is a partial view in section of FIG. 1, showing an integral rod section of the plastic cover shell fitted into one end of the first metal frame tube.

Referring to FIGS. 1 and 3, the unit frame 1 comprises a first metal frame tube 11, a second metal frame tube 12, a third metal frame tube 13, and a plastic cover shell 14. The plastic cover shell 14 is directly molded on the metal frame tubes 11, 12 and 13 to hold them together, having integral arm sections 140, 141 and 142 connected between the first metal frame tube 11 and the second metal frame tube 12, integral arm sections 143 connected between the second metal frame tube 12 and the third metal frame tube 13, a plurality of corner notches 144 provided above arm sections 140, a plurality of integral rod sections 10 respectively fitted into the metal frame tubes 11, 12 and 13 (see FIG. 3), and at least one coupling portion 15. The at least one coupling portion 15 may be of U-shaped or of various shapes. Each of the at least one coupling portion 15 defines a bearing recess 151 for connection to another unit frame. Each of the metal frame tubes 11, 12 and 13 has one end embedded in the plastic cover shell 14, and an opposite end 111, 121 or 131 exposed to the exterior for mounting connecting shafts or like elements.

Figure 2:
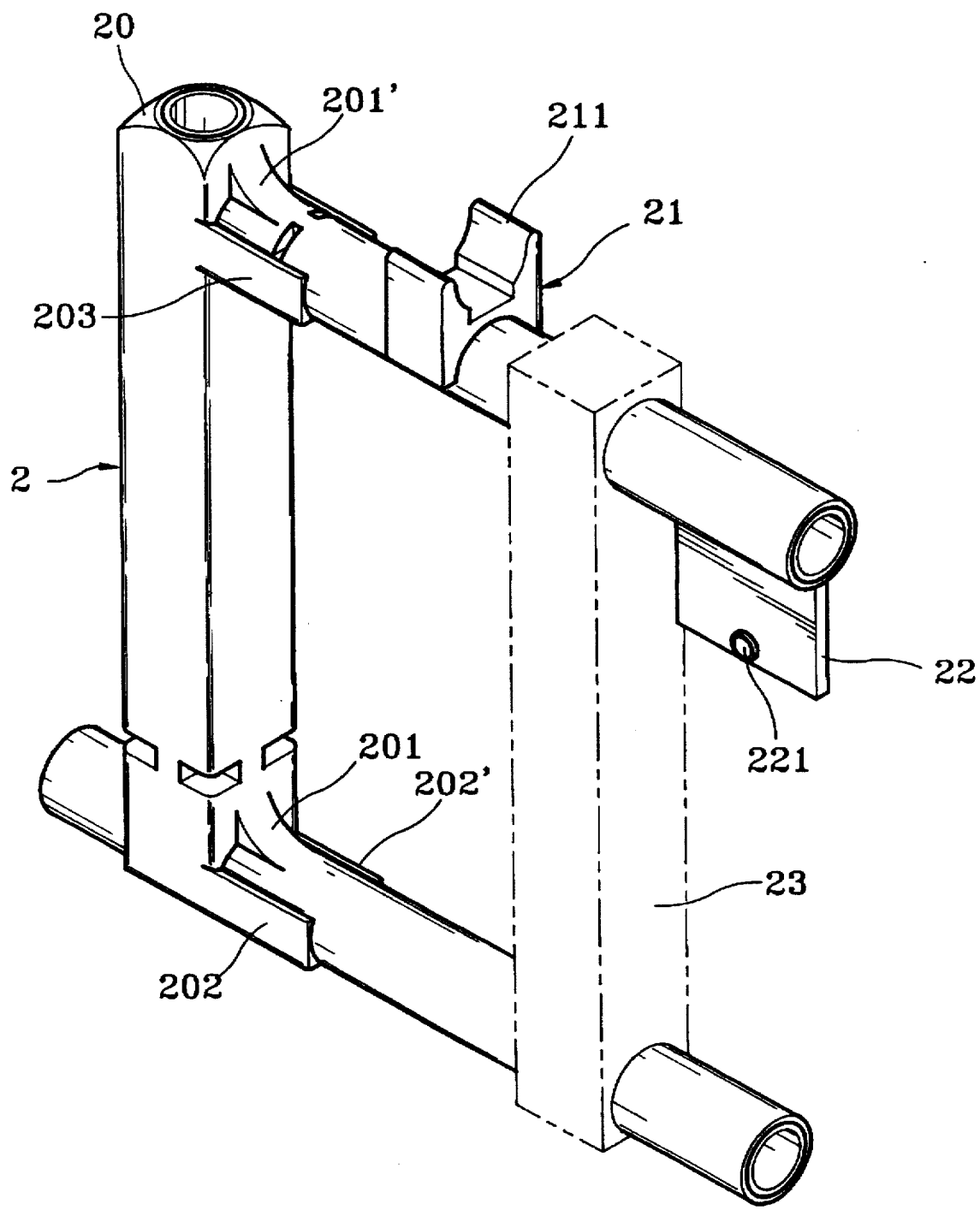
FIG. 2 shows another unit frame according to the present invention.

The unit frame shown in FIG. 2 and referenced by 2 also comprises three metal frame tubes and a plastic cover shell 20 directly molded on the metal frame tubes. The plastic cover shell 20 comprises integral arm sections 201, 201', 202, 202' and 203 respectively connected between the metal frame tubes, and at least one first coupling portion 21 with a respective bearing recess 211, and at least one second coupling portion 22 with a respective screw hole 221 for connection to a coupling means of other unit frames by use of screws.

Figure 4:
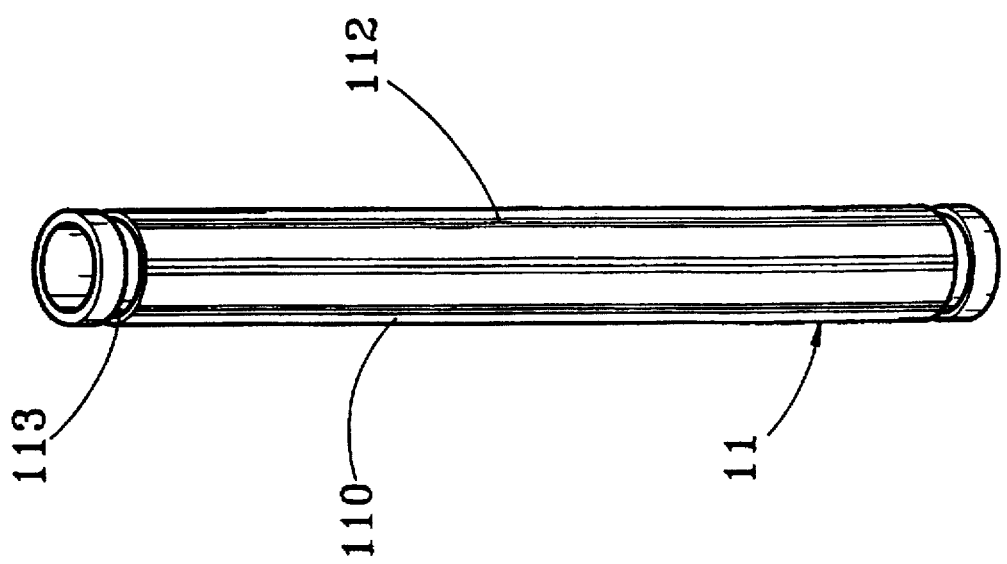
FIG. 4 shows a metal frame tube according to the present invention.

Referring to FIG. 4, the metal frame tube 11, 12 or 13 comprises two annular grooves 113 around the outside wall 110 near two opposite ends, and a plurality of longitudinal grooves 112 on the outside wall 110 between the annular grooves 113. When molding the plastic cover shell 14 or 20 on the metal frame tubes 11, 12 and 13, molten plastics fills up the annular grooves 113 and the longitudinal grooves 112. Therefore, when the plastic cover shell 14 or 20 is formed, it is prohibited from rotary motion relative to the frame tube 11, 12 or 13.

Figure 6:
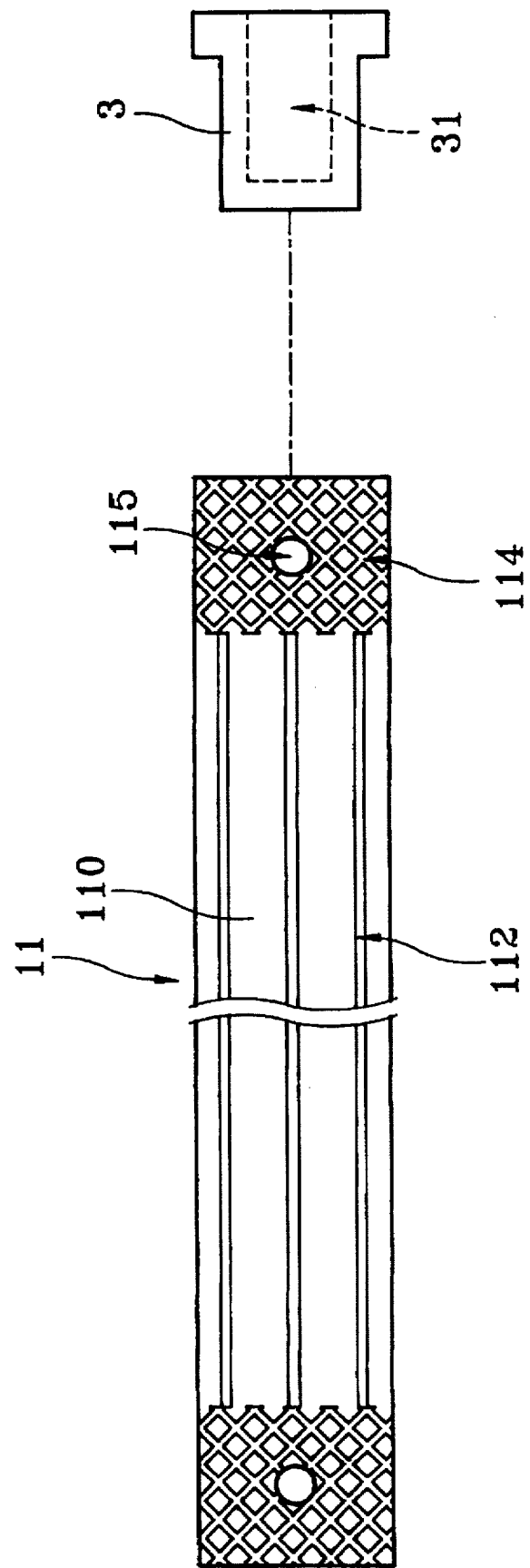
FIG. 6 shows an alternate form of the metal frame tube according to the present invention.
Figure 7:
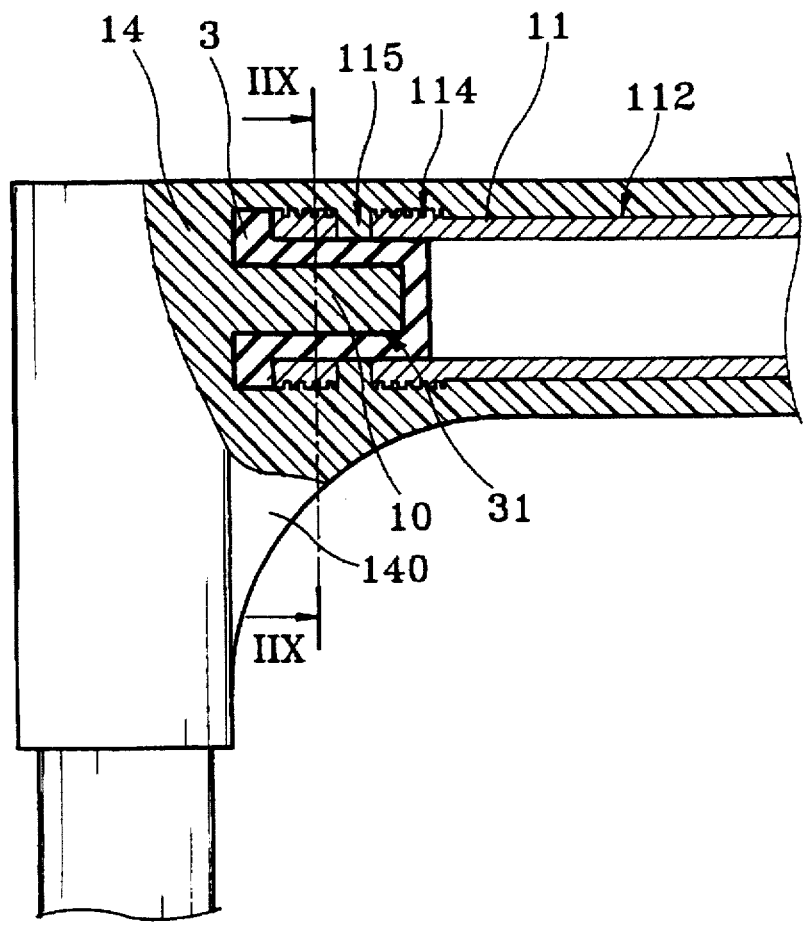
FIG. 7 shows an integral rod section of the plastic cover shell fitted into one end of the metal frame tube of FIG. 6.
Figure 8:
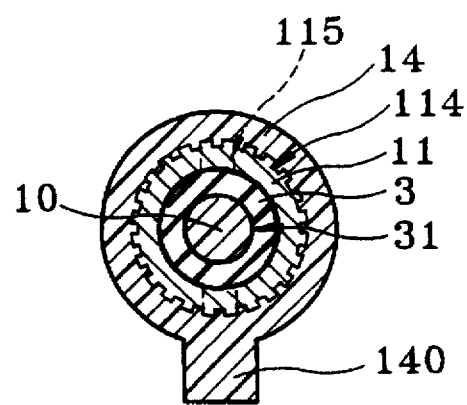
FIG. 8 is a sectional view along IIX—IIX of FIG. 7.

FIGS. 6, 7, and 8 show an alternate form of the present invention. The metal frame tube, referenced by 11, comprises intersected or criss-crossed locating grooves 114 around the two opposite ends of the outside wall 110 and a plurality of longitudinal grooves 112 connected between the intersected locating grooves 114 for molding the plastic cover sell 14. Therefore, when the plastic cover shell 14 is molded into the intersected locating grooves 114, it is prohibited from displacement relative to the metal frame tube 11. A plurality of through holes 115 are made on the two opposite ends of the metal frame tube 11 at the areas of the intersected locating grooves 114. Therefore, molten plastic will flow into the through holes 115 during the molding of the plastic cover shell 14. In order to control the length of the integral rod section 10 in one end of the metal frame tube 11, a stopper 3 may be used and fitted into the respective end of the metal frame tube 11. The stopper 3 is made of flexible material defining a recessed chamber 31. When the stopper 3 is fastened to one end of the metal frame tube 11, the recessed chamber 31 is disposed outwards for receiving molten plastic during the molding of the plastic cover shell 14, for permitting one integral rod section 10 of the plastic cover shell 14 to be, formed in the recessed chamber 31. Because molten plastic is forced into the mold by pressure, the stopper 3 is expanded and secured to the inside wall of the metal frame tube 11 when molten plastic is forced into the recessed chamber 31. The stopper 3 stops molten plastic from entering the inside of the metal frame tube 11, and permits one integral rod section 10 to be formed in the recessed chamber 31. The arrangement of the through holes 115 and the intersected grooves 114 firmly secures the plastic cover shell 14 to the metal frame tube 11, thus prohibiting the plastic cover shell 14 from moving relative to the metal frame tube 11.

It is to be understood that the drawings are designed for purposes of illustration only, and are not intended as a definition of the limits and scope of the invention disclosed.

I claim:

1. A wheelchair frame assembly comprising a plurality of unit flames connected together by fastening devices, wherein each unit frame comprises:

a plurality of metal frame robes connected to one another, each metal frame tube having a periphery and a pair of opposite ends a groove means around the periphery of each end and a plurality of longitudinal grooves spaced around the periphery and connected between said groove means;

a plastic cover shell directly molded on said metal frame tubes and covering the groove means and longitudinal grooves of each metal frame tube, the cover shell having a plurality of integral arm sections respectively connected between each two adjacent metal frame tubes and a plurality of integral rod sections, each rod section being respectively fitted into one end of each metal frame tube; and a plurality of coupling means integrally extended from said plastic cover shell for permitting one unit frame to be coupled to another.

2. The wheelchair frame assembly of claim 1 wherein each metal frame tube has one end embedded in said plastic cover shell and an opposite open end for engagement with other wheelchair components.

3. The wheelchair frame assembly of claim 1 wherein at least one of said coupling means comprises a horseshoe-like projection for connection to another unit frame.

4. The wheelchair frame assembly of claim 1 wherein at least one of said coupling means comprises a screw hole for connecting the coupling means to a coupling means of another unit frame by a screw means.

5. The wheelchair frame assembly of claim 1 wherein each groove means comprises a plurality, of intersected grooves for binding said plastic cover shell.

6. The wheel chair frame assembly of claim 5 wherein each metal frame tube further comprises a plurality of through holes through the intersected grooves.

7. The wheelchair frame assembly of claim 1 wherein the groove means includes an annular groove.

8. A wheelchair frame assembly comprising a plurality of unit frames connected together by fastening devices, wherein each unit frame comprises:

a plurality of metal frame tubes connected to one another, each metal frame tube having a periphery and a pair of opposite ends, a set of intersected grooves around the periphery of each end, a plurality of longitudinal grooves spaced around the periphery and connected between said sets of intersected grooves, and a plurality of through holes at said sets of intersected grooves;

a hollow stopper respectively fitted into an end of each of two metal frame tubes, each hollow stopper defining an outwardly disposed recessed chamber;

a plastic cover shell directly molded on said metal frame tubes and covering the longitudinal grooves, through holes, and sets of intersected grooves of each metal frame tube, the cover shell having integral arm sections respectively connected between each two adjacent metal frame tubes and an integral rod section respectively fitted into the recessed chamber of each hollow stopper; and a plurality of coupling means integrally extended from said plastic cover shell for permitting one unit frame to be coupled to another.

* * * * *